(12) United States Patent
Asai

(10) Patent No.: US 9,168,820 B2
(45) Date of Patent: Oct. 27, 2015

(54) VEHICLE USING COMPRESSED GAS, AND CONTROL DEVICE THEREFOR

(71) Applicant: PANASONIC CORPORATION, Osaka (JP)

(72) Inventor: Katsuhiko Asai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/507,921

(22) Filed: Oct. 7, 2014

(65) Prior Publication Data

US 2015/0020513 A1     Jan. 22, 2015

Related U.S. Application Data

(63) Continuation of application No. 13/670,567, filed on Nov. 7, 2012, now Pat. No. 8,919,485, which is a continuation of application No. PCT/JP2012/001273, filed on Feb. 24, 2012.

(30) Foreign Application Priority Data

Mar. 3, 2011   (JP) .................................. 2011-046215

(51) Int. Cl.
*B60K 3/00* (2006.01)
*B62M 1/10* (2010.01)
(Continued)

(52) U.S. Cl.
CPC .. *B60K 3/00* (2013.01); *B62M 1/10* (2013.01); *B62M 6/00* (2013.01); *B62M 6/70* (2013.01); *F01B 25/04* (2013.01); *B62M 2007/005* (2013.01)

(58) Field of Classification Search
CPC ...... B60K 3/00; Y02T 10/32; B60Y 2400/15; F02C 1/02; F02C 6/16; F02C 6/20; G01M 3/00; G01M 3/007
See application file for complete search history.

(56) References Cited

U.S. PATENT DOCUMENTS 3,980,152 A    9/1976  Manor
4,043,126 A    8/1977  Santos
(Continued)

FOREIGN PATENT DOCUMENTS

JP    05-246375    9/1993
JP    05-288201    11/1993
(Continued)

OTHER PUBLICATIONS

International Search Report issued May 22, 2012 in International (PCT) Application No. PCT/JP2012/001273.
(Continued)

*Primary Examiner* — Katy M Ebner
*Assistant Examiner* — Emma K Frick
(74) *Attorney, Agent, or Firm* — Wenderoth, Lind & Ponack, L.L.P.

(57) ABSTRACT

A power unit that can periodically determine a leakage of a compressed gas to early discover a defect, such as a crack, and a vehicle in which the power unit is used are provided. A vehicle that runs with an air engine including a gas machinery includes a control device. The control device includes an adjuster that controls an output of the gas machinery such that a target output is obtained, a pressure measuring unit that measures the pressure of the compressed gas at the piping unit of the air engine, and a determination unit that determines a leakage state of the compressed gas based on a change in pressure, which is measured by the pressure measuring unit every time the target output of the gas machinery becomes substantial zero. The control device suspends the determination of the leakage state when the target output of the gas machinery changes from substantial zero during the determination.

9 Claims, 6 Drawing Sheets

(51) Int. Cl.
  *B62M 6/00* (2010.01)
  *B62M 6/70* (2010.01)
  *F01B 25/04* (2006.01)
  *B62M 7/00* (2010.01)

(56) References Cited

U.S. PATENT DOCUMENTS

| | | |
|---|---|---|
| 1,902,124 A | 3/1993 | Halloran |
| 6,467,466 B1 | 10/2002 | Maekawa et al. |
| 6,549,857 B2 | 4/2003 | Fierro et al. |
| 8,225,900 B2 | 7/2012 | Domes |
| 8,511,409 B2 | 8/2013 | Mensah |
| 2010/0078254 A1 | 4/2010 | Rolfe et al. |
| 2010/0307849 A1 | 12/2010 | Li |

FOREIGN PATENT DOCUMENTS

| | | |
|---|---|---|
| JP | 08-230748 | 9/1996 |
| JP | 2001-041106 | 2/2001 |
| JP | 2002-002577 | 1/2002 |
| JP | 2005-035502 | 2/2005 |

OTHER PUBLICATIONS

"Moped gets in on the air-powered fun", Jeremy Korzeniewski, Apr. 2008, http://green.autoblog.com/2008/04/16/moped-gets-in-on-the-air-powered-fun/.

VEHICLE USING COMPRESSED GAS, AND CONTROL DEVICE THEREFOR

TECHNICAL FIELD

The present invention relates to a vehicle that detects a leakage of a compressed gas to improve reliability and a control device thereof in a vehicle in which a propulsive force is supplied by the compressed gas.

BACKGROUND ART

There has been devised a method in which high-pressure air is accumulated in a tank by utilizing braking energy in a downhill and used as drive energy of vehicles, such as a bicycle (for example, refer to PTLs 1 to 4).

CITATION LIST

Patent Literature

PTL 1: Japanese Patent No. 3038038
PTL 2: Unexamined Japanese Patent Publication No. H08-230748
PTL 3: Unexamined Japanese Patent Publication No. 2002-2577
PTL 4: Unexamined Japanese Patent Publication No. 2005-35502

SUMMARY OF THE INVENTION

Problems to be Solved by the Invention

However, in the conventional configuration in which a gas pressure is used as energy accumulation means, there is a risk of unintentionally releasing compressed gas energy enough to be able to drive the vehicle in the case that a crack is generated in gas piping by damages, such as turnover of the vehicle. Additionally, in the case that troubles, such as the crack, progress gradually by a vibration and a shock during running, a symptom of dangerousness is hardly found only by checking the leakage from the piping before running.

Solution to Problem

In order to achieve the above object, the present invention is configured as follows.

A vehicle runs with a drive force generated by an air engine including a gas machinery, and the air engine includes: a gas container in which a compressed gas is accumulated; the gas machinery that is driven by the compressed gas supplied from the gas container; a control valve that controls an output of the gas machinery; a piping unit that connects the gas container and the control valve; and a pressure gauge that detects a pressure of the compressed gas at the piping unit.

The vehicle includes: a manipulation instruction unit that outputs a command value corresponding to a target output of the gas machinery; and a control device that operates the control valve based on the command value from the manipulation instruction unit, and controls the output of the gas machinery such that the target output is obtained. The control device includes: a pressure measuring unit that measures the pressure of the compressed gas at the piping unit based on an output of the pressure gauge; and a determination unit that determines a leakage state of the compressed gas based on a change in pressure, which is measured by the pressure measuring unit every time the target output of the gas machinery becomes substantial zero. The control device compares the pressure, which is measured by the pressure measuring unit at the time the target output of the gas machinery becomes substantial zero, to a pressure that is measured by the pressure measuring unit after a given time elapses, the control device determines that the compressed gas leaks when a pressure difference is greater than a given amount, and the control device suspends the determination of the leakage state when the target output of the gas machinery changes from substantial zero within the time.

Advantageous Effects of Invention

In accordance with the present invention, the control device includes the pressure measuring unit that measures the pressure of the compressed gas at the piping unit, and control device determines the leakage state of the compressed gas based on the change in pressure, which is measured by the pressure measuring unit every time the target output of the gas machinery becomes substantial zero, so that the leakage of the compressed gas can periodically be determined. That is, in accordance with the present invention, the leakage determination is made every time the gas machinery becomes the non-operated state, so that the symptom of the progression of the compressed gas leakage from the piping can early be discovered. There is no influence on a response in demanding the output of the gas machinery, because the determination of the leakage state is suspended when the target output of the gas machinery changes from substantial zero during the determination. Therefore, the flow of the compressed gas is previously avoided with no influence on a running property, and reliability can be improved.

DESCRIPTION OF EMBODIMENTS

Figure 1:
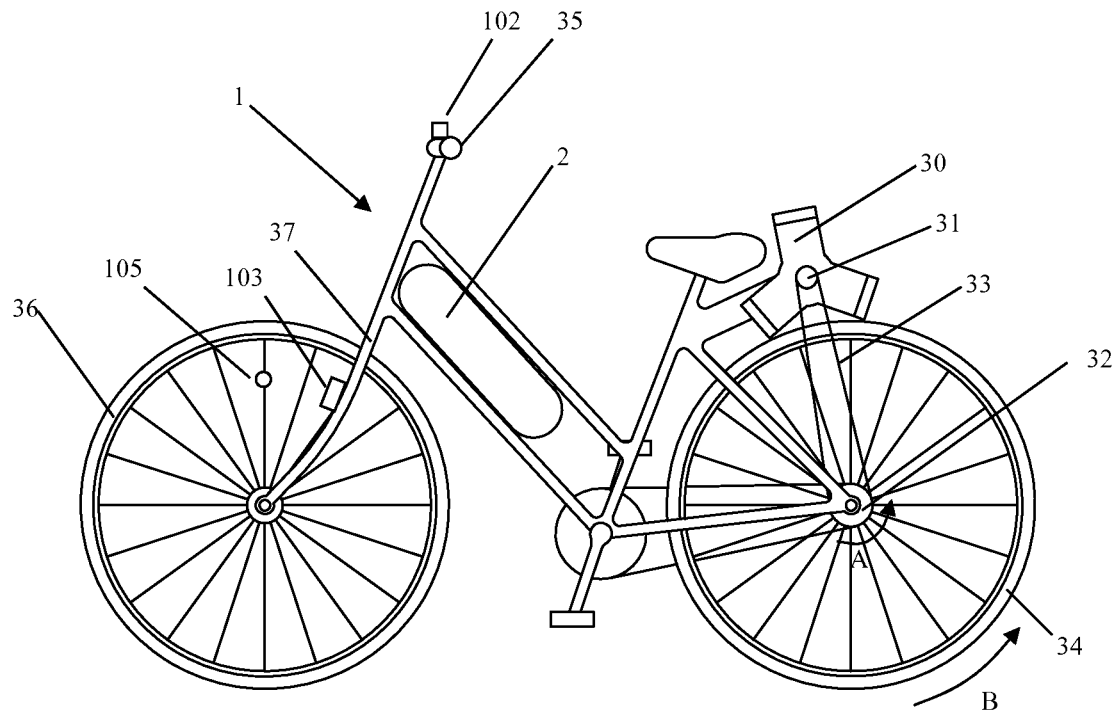
FIG. 1 is a view schematically illustrating a bicycle according to a first exemplary embodiment of the present invention.

Hereinafter, exemplary embodiments of the present invention will be described in detail with reference to the drawings.

Various aspects of the present invention will be described before the exemplary embodiments of the present invention are described.

In accordance with a first aspect of the present invention, a vehicle runs with a drive force generated by an air engine including a gas machinery, and the air engine includes: a gas container in which a compressed gas is accumulated; the gas machinery that is driven by the compressed gas supplied from the gas container; a control valve that controls an output of the gas machinery; a piping unit that connects the gas container and the control valve; and a pressure gauge that detects a pressure of the compressed gas at the piping unit.

The vehicle includes: a manipulation instruction unit that outputs a command value corresponding to a target output of the gas machinery; and a control device that operates the control valve based on the command value from the manipulation instruction unit, and controls the output of the gas machinery such that the target output is obtained. The control device includes: a pressure measuring unit that measures the pressure of the compressed gas at the piping unit based on an output of the pressure gauge; and a determination unit that determines a leakage state of the compressed gas based on a change in pressure, which is measured by the pressure measuring unit every time the target output of the gas machinery becomes substantial zero. The control device compares the pressure, which is measured by the pressure measuring unit at the time the target output of the gas machinery becomes substantial zero, to a pressure that is measured by the pressure measuring unit after a given time elapses, the control device determines that the compressed gas leaks when a pressure difference is greater than a given amount, and the control device suspends the determination of the leakage state when the target output of the gas machinery changes from substantial zero within the time.

In accordance with the above configuration, the leakage determination is made every time the gas machinery becomes the non-operated state, so that the symptom of the progression of the compressed gas leakage from the piping can early be discovered. There is no influence on a response in demanding the output of the gas machinery, because the determination of the leakage state is suspended when the target output of the gas machinery changes from substantial zero during the determination. Therefore, the leakage of the compressed gas is periodically determined with no influence on a running property, so that emergencies, such as a crack, can early be discovered.

In accordance with a second aspect of the present invention, a vehicle runs with a drive force generated by an air engine including a gas machinery, and the air engine includes: a gas container in which a compressed gas is accumulated; the gas machinery that is driven by the compressed gas supplied from the gas container; a control valve that controls an output of the gas machinery; a piping unit that connects the gas container and the control valve; and a pressure gauge that detects a pressure of the compressed gas at the piping unit.

The vehicle includes: a manipulation instruction unit that outputs a command value corresponding to a target output of the gas machinery; and a control device that operates the control valve based on the command value from the manipulation instruction unit, and controls the output of the gas machinery such that the target output is obtained. The control device includes: a pressure measuring unit that measures the pressure of the compressed gas at the piping unit based on an output of the pressure gauge; and a determination unit that determines a leakage state of the compressed gas based on a change in pressure, which is measured by the pressure measuring unit every time the target output of the gas machinery becomes substantial zero. The control device measures a time until a change in pressure measured by the pressure measuring unit reaches a given amount based on a time point at which the target output of the gas machinery becomes substantial zero, the control device determines that the compressed gas leaks when the measured time is less than a given time, and the control device suspends the determination of the leakage state when the target output of the gas machinery changes from substantial zero before the change in pressure, which is measured by the pressure measuring unit reaches the given amount.

In accordance with the above configuration, the leakage determination is made every time the gas machinery becomes the non-operated state, so that the symptom of the progression of the compressed gas leakage from the piping can early be discovered. There is no influence on a response in demanding the output of the gas machinery, because the determination of the leakage state is suspended when the target output of the gas machinery changes from substantial zero during the determination. Therefore, the leakage of the compressed gas is periodically determined with no influence on the running property, so that emergencies, such as the crack, can early be discovered.

In accordance with a third aspect of the present invention, in the vehicle in accordance with the first or second aspect, the target output of the gas machinery becomes substantial zero during braking in the vehicle.

In accordance with the above configuration, in the state in which inertia running transitions to braking, because the state in which the target output of the gas machinery is substantial zero is continued longer, the leakage determination can securely be made. Accordingly, the high-safety vehicle can be obtained.

In accordance with a fourth aspect of the present invention, in the vehicle in accordance with one of the first to third aspects, the vehicle is a bicycle.

In accordance with the above configuration, because the time in which the acceleration by the power unit is not required is frequently generated during the running, the leakage determination is made at a high frequency. Accordingly, the high-safety vehicle can be obtained.

In accordance with a fifth aspect of the present invention, in the vehicle in accordance with one of the first to fourth aspects, the control device suspends the determination of the leakage state when the pressure measured by the pressure measuring unit is less than or equal to a given amount at the time point at which the target output of the gas machinery becomes substantial zero.

In accordance with the above configuration, when the piping is not filled with the compressed gas, it is not necessary to make the useless leakage determination. Accordingly, the vehicle that effectively makes the leakage determination can be obtained.

In accordance with a sixth aspect of the present invention, the vehicle in accordance with one of the first to fifth aspects further includes a speed measuring unit that measures a speed of the vehicle, wherein the control device determines the leakage state only when the measured speed of the vehicle is greater than or equal to a given amount.

In accordance with the above configuration, the leakage determination is continuously made only in an environment in which the change of the leakage state is easily generated due to a vibration during the running and the like. Accordingly, the vehicle that effectively makes the leakage determination can be obtained.

In accordance with a seventh aspect of the present invention, the vehicle in accordance with one of the first to sixth aspects includes a leakage-state indicator indicating that the control device determines that the compressed gas leaks.

In accordance with the above configuration, a rider can easily determine the situation when the leakage is generated. Accordingly, the high-safety vehicle can be obtained.

In accordance with an eighth aspect of the present invention, the vehicle in accordance with one of the first to seventh aspects includes a shutoff valve between the gas container and the piping unit, wherein the control device operates the shutoff valve to shut off a flow of the compressed gas from the gas container while determining the leakage state.

In accordance with the above configuration, the leakage determination is made using only the gas pressure in the piping unit, reduction of a flow amount during the leakage or shortening of a leakage determination time can be implemented. Accordingly, the vehicle that effectively makes the leakage determination can be obtained.

In accordance with a ninth aspect of the present invention, in the vehicle in accordance with the eighth aspect, the control device operates the shutoff valve to shut off the flow of the compressed gas from the gas container irrespective of the target output of the gas machinery when determining that the compressed gas leaks.

In accordance with the above configuration, the compressed gas can be prevented from continuously leaking from the piping unit. Accordingly, the high-safety vehicle can be obtained.

In accordance with a tenth aspect of the present invention, in the vehicle in accordance with one of the first to eighth aspects, the plural piping units are connected in parallel, the control device can selectively shut off each piping unit, and the control device individually shuts off the piping unit, in which the leakage is generated, based on a leakage determination result of the compressed gas.

In accordance with the above configurations, the gas machinery can continuously be operated while the compressed gas leakage from the piping unit is prevented. Accordingly, the vehicle in which a balance is achieved between the safety and manipulation performance can be obtained.

A power unit according to an exemplary embodiment of the present invention, a vehicle in which the power unit is used, and a vehicle driving method will be described with reference to the drawings.

First Exemplary Embodiment

Figure 2:
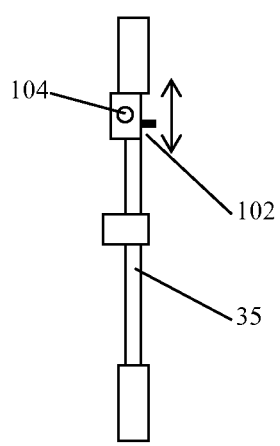
FIG. 2 is a plan view schematically illustrating a handlebar of the bicycle of the first exemplary embodiment of the present invention.
Figure 3:
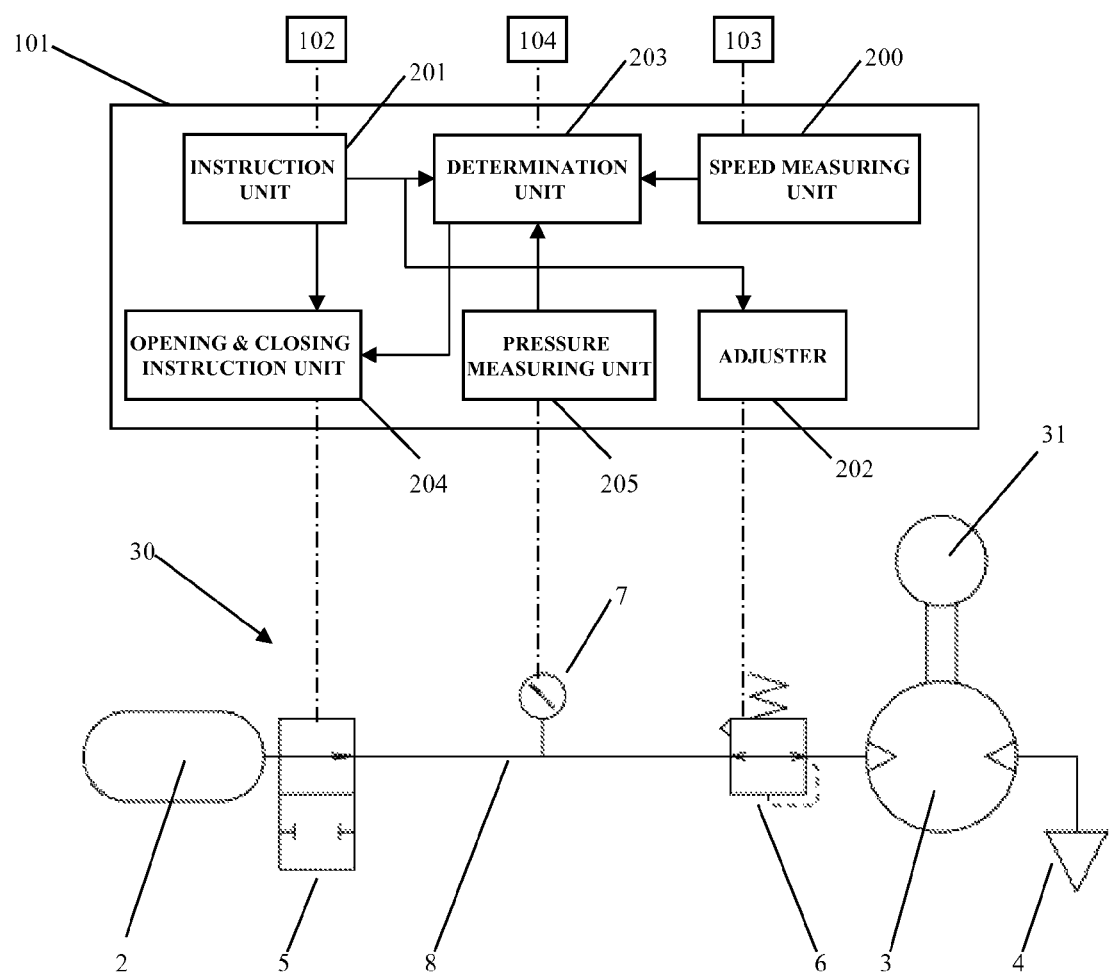
FIG. 3 is a view schematically illustrating an air engine mounted on the bicycle of the first exemplary embodiment of the present invention.

FIG. 1 schematically illustrates two-wheel bicycle 1 according to a first exemplary embodiment of the present invention as an example of the vehicle. FIG. 2 is a plan view schematically illustrating handlebar 35 of bicycle 1 in FIG. 1. FIG. 3 schematically illustrates air engine 30 which is an example of the power unit mounted on a rear portion (near a rear wheel) of bicycle 1 of the first exemplary embodiment.

In bicycle 1 in FIG. 1, the numeral 2 designates an air tank, the numeral 30 designates an air engine, the numerals 31 and 32 designate sprockets, the numeral 33 designates a drive chain, and the numeral 34 designates a rear wheel. Further, in FIG. 1, the numeral 35 designates a handlebar, the numeral 36 designates a front wheel, the numeral 37 designates a front fork, the numeral 102 designates an output adjusting slide bar, the numeral 103 designates a speedmeter, and the numeral 105 designates a magnet.

In FIG. 2, the numeral 102 designates an output adjusting slide bar, and the numeral 104 designates an LED.

A lower half of FIG. 3 illustrates detailed air engine 30. The numeral 2 designates an air tank, the numeral 5 designates an on-off valve, the numeral 7 designates a pressure gauge that detects a pressure, the numeral 8 designates an air pipe, the numeral 6 designates a regulator, the numeral 3 designates an air motor, the numeral 4 is an opening port to atmosphere, and the numeral 31 designates a sprocket. An upper half of FIG. 3 illustrates controller 101 which is an example of the control device of air engine 30. Hereinafter, the control device is referred to as controller 101.

Controller 101 in FIG. 3 includes instruction unit 201 that issues an instruction on a target output value of air motor 3, opening and closing instruction unit 204 that issues an instruction on opening and closing of on-off valve 5, adjuster 202 that adjusts regulator 6, pressure measuring unit 205 that measures the pressure with pressure gauge 7, speed measuring unit 200 that measures a speed of bicycle 1 with speedmeter 103, and determination unit 203 that makes a leakage determination based on a measurement result.

In FIG. 1, an output of air engine 30 is transmitted to sprocket 31. Rear-wheel-side sprocket 32 provided in rear wheel 34 of bicycle 1 and engine-side sprocket 31 are coupled by drive chain 33. Sprocket 32 and rear wheel 34 are connected with a unidirectional clutch interposed therebetween. Sprocket 32 and rear wheel 34 rotate integrally in the case that a counterclockwise (A direction) rotational speed of sprocket 32 is greater than a counterclockwise (B direction) rotational speed of rear wheel 34. The output of air engine 30 is transmitted to rear wheel 34 in the case that air engine 30 generates a torque conducive to a propulsive force of bicycle 1. In other cases, sprocket 32 and rear wheel 34 rotate independently, and air engine 30 has no influence on rear wheel 34. With this configuration, the air engine 30 generates the drive torque to be able to provide the propulsive force to bicycle 1.

In FIG. 3, air engine 30 includes air tank 2 which is an example of the gas container, on-off valve 5 which is an example of the shutoff valve, air motor 3 which is an example of the gas machinery, regulator 6 which is an example of the control valve, air pipe 8 which is an example of the piping unit, and controller 101 which is an example of the control device. Compressed air is accumulated in air tank 2 which is an example of the gas container. On-off valve 5 is provided in an opening of air tank 2, and controls connection and shutoff of air tank 2 and air pipe 8. Regulator 6 is connected to on-off valve 5 with air pipe 8 interposed therebetween. Regulator 6 adjusts the output of air motor 3 that is connected on a downstream side of regulator 6. Air motor 3 is driven by a pressure difference between the compressed air, which is supplied from air tank 2 through regulator 6, and surrounding atmosphere, which is supplied by opening port to atmosphere 4.

Controller 101 controls operations of on-off valve 5 and regulator 6 while acquiring information on pressure gauge 7 which is an example of the pressure measuring unit measuring the pressure in air pipe 8. Output adjusting slide bar 102 which is an example of the manipulation instruction unit is connected to controller 101, and a manipulation of output adjusting slide bar 102 provides an output command of the air motor to controller 101. For example, in FIG. 2, output adjusting slide bar 102 is installed near a grip of handlebar 35. The output command value becomes zero when output adjusting slide bar 102 is located closest to the grip side (upper side in FIG. 2), and the output command value becomes the maximum when output adjusting slide bar 102 is located closest to the center side of handlebar 35 (lower side in FIG. 2). A display (in the first exemplary embodiment, LED 104) which is an example of the leakage-state indicator indicating the generation of the leakage is provided in output adjusting slide bar 102. A battery can supply energy to LED 104. In the first exemplary embodiment, desirably the leakage-state indicator in which LED 104 is lit is used such that the leakage state is indicated by a simple configuration. However, the leakage-state indicator is not limited to LED 104, but a sound or a vibration may be used in the leakage-state indicator. Speedmeter 103 which is an example of the speed measurement device is connected to controller 101 such that controller 101 acquires information on a speed of bicycle 1. For example, in FIG. 1, speedmeter 103 is installed in front fork 37 adjacent to front wheel 36. A rotational speed of front wheel 36 is decided from a period in which magnet 105 provided in a spoke of front wheel 36 comes across speedmeter 103, and the speed of bicycle 1 is calculated from a diameter of front wheel 36.

Figure 4:
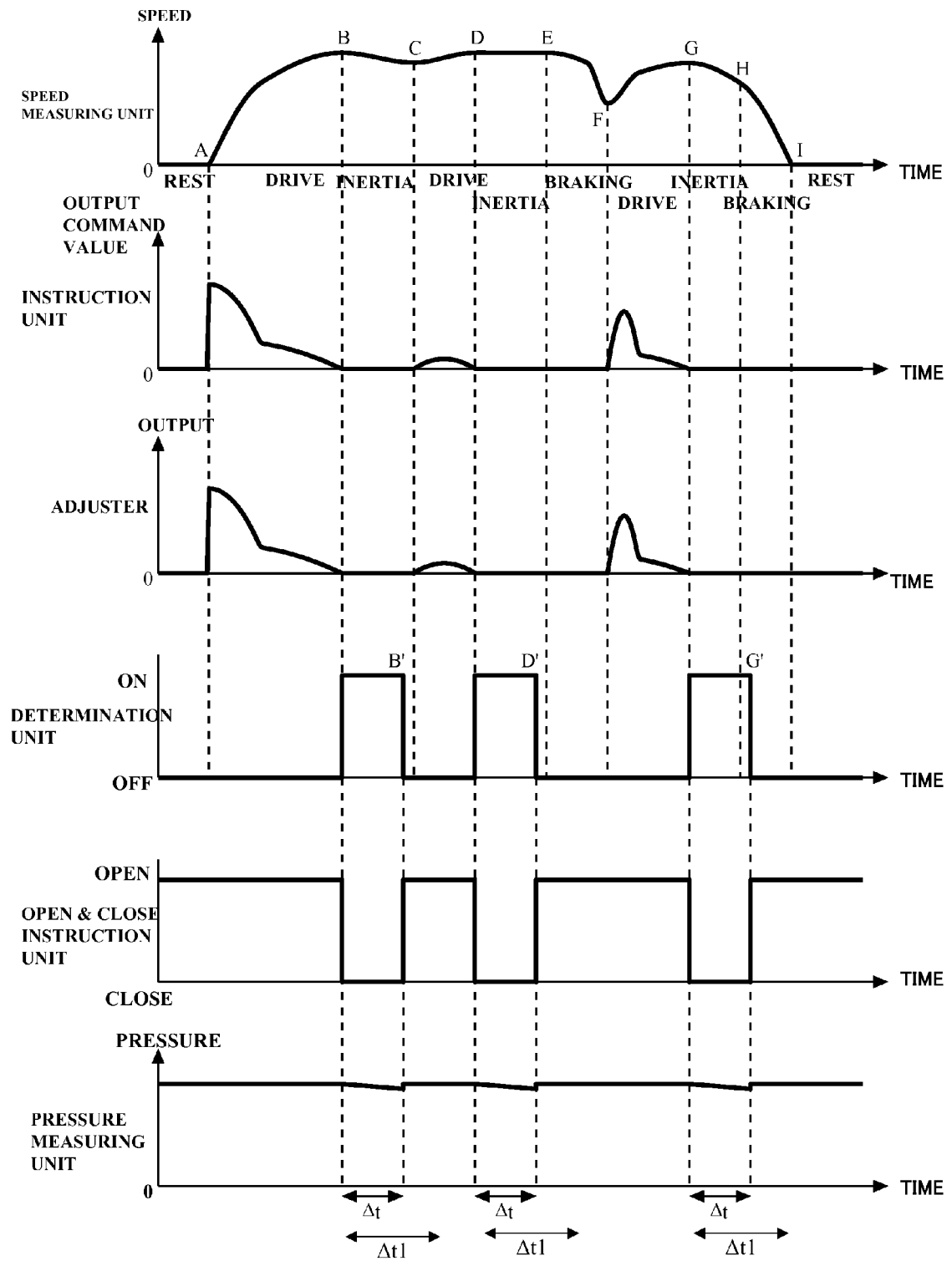
FIG. 4 is a diagram illustrating an example of a timing chart, in which a pressure is measured at regular time intervals to check a leakage, of the first exemplary embodiment of the present invention.
Figure 5:
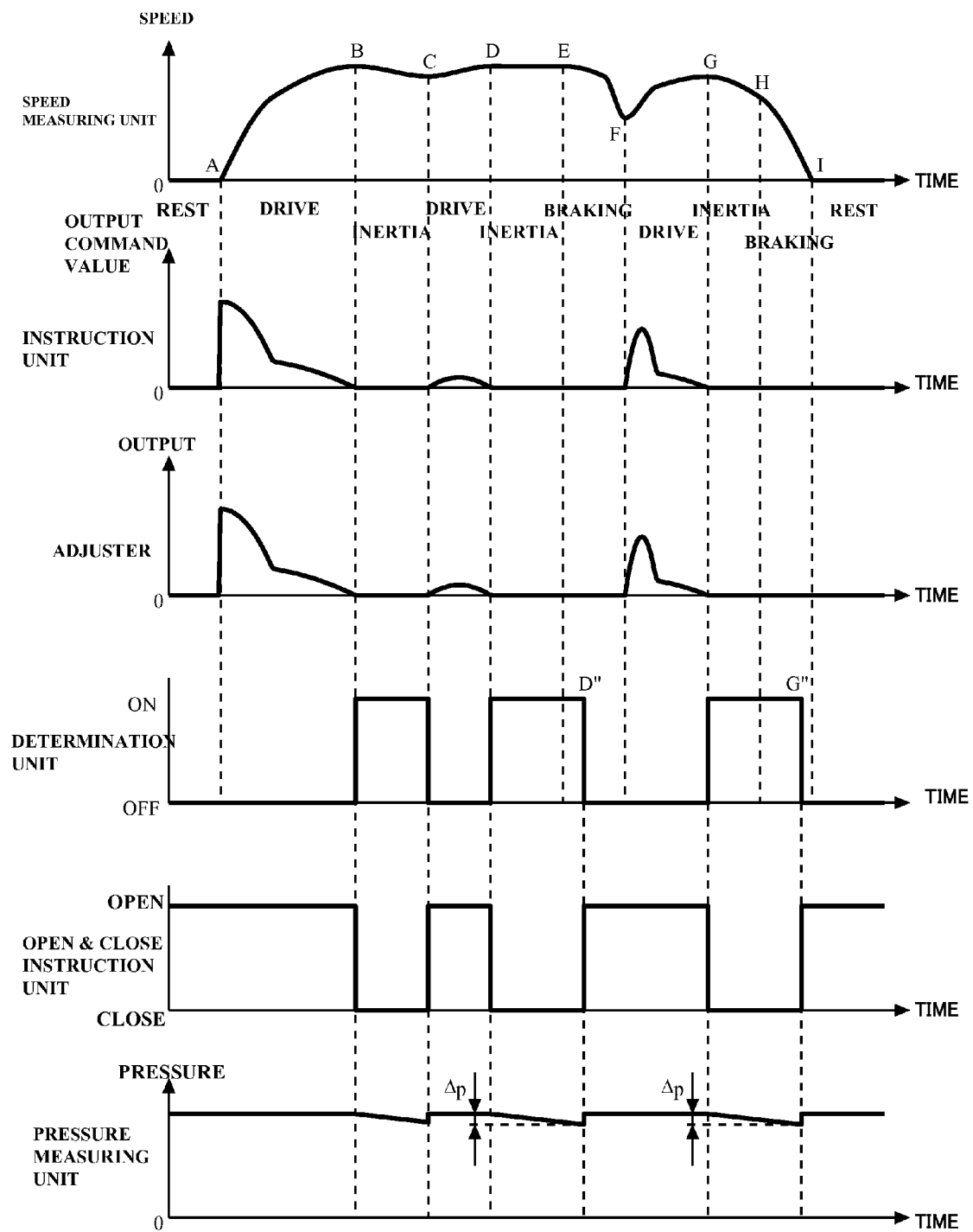
FIG. 5 is a diagram illustrating an example of a timing chart, in which the leakage is checked such that the pressure becomes a predetermined ratio, of the first exemplary embodiment of the present invention.

FIGS. 4 and 5 illustrate examples of a timing chart in a running state of bicycle 1.

FIG. 4 illustrates a timing chart in which the pressure is measured at regular time intervals to check the leakage.

FIG. 5 illustrates a timing chart in which the leakage is checked such that the pressure becomes a predetermined ratio.

Figure 6:
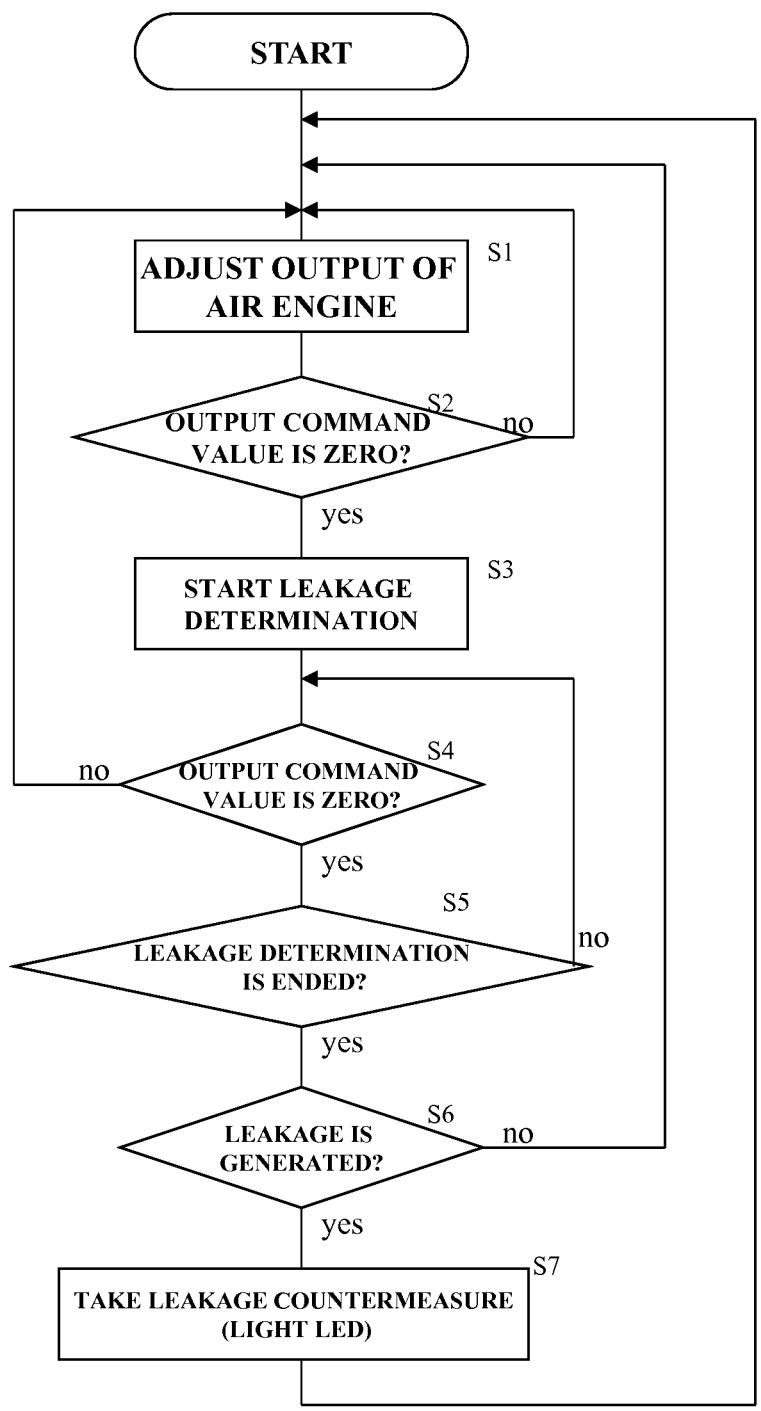
FIG. 6 is a flowchart of a leakage determination made by a controller of the first exemplary embodiment of the present invention.

The detailed descriptions about the check and determination of the leakage in FIGS. 4 and 5 are made together with a flowchart in FIG. 6 of controller 101.

A relationship between a running state of bicycle 1 and an operating state of air engine 30 will be described with reference to FIGS. 4 and 5.

The output of speed measuring unit 200 indicates the speed of bicycle 1. The output of instruction unit 201 indicates actuation of air engine 30. The output of adjuster 202 indicates control of regulator 6. The output of determination unit 203 indicates a determination zone of the leakage measurement. The leakage is measured in the determination zone. Whether the leakage is generated is determined based on a leakage result. The output of opening and closing instruction unit 204 indicates the opening and closing of on-off valve 5. The output of pressure measuring unit 205 indicates the pressure measured with pressure gauge 7. The running state of bicycle 1 includes four states: rest, drive, inertia, and braking states as illustrated in the output of speed measuring unit 200 in FIGS. 4 and 5.

In the rest state (in FIGS. 4 and 5, before A after I), bicycle 1 stops, and the output of air engine 30 is zero. It is found that the output of adjuster 202 is zero while the output of air engine 30 is zero.

In the drive state (in FIGS. 4 and 5, between A and B, between C and D, between F and G), propulsive forces generated by pedaling of a rider and air engine 30 are provided to bicycle 1 so that bicycle 1 accelerates or runs at a constant speed. At this point, in addition to the pedaling of the rider, air engine 30 performs the output necessary for the acceleration of bicycle 1 and overcoming a running resistance. The output of adjuster 202 is greater than zero.

In the inertia state (in FIGS. 4 and 5, between B and C, between D and E, between G and H), the output of air engine 30 becomes zero, and the output of adjuster 202 becomes zero. The speed of bicycle 1 varies according to a road surface state. That is, bicycle 1 decelerates on an uphill or a flat road, runs at a constant speed on a shelving downhill matched with the running resistance, and accelerates on a steep downhill.

In the braking state (in FIGS. 4 and 5, between E and F, between H and I), a braking force of a brake is provided to bicycle 1, basically bicycle 1 decelerates although sometimes bicycle 1 accelerates or runs at a constant speed on the downhill. At this point, the output of air engine 30 becomes zero, and the output of adjuster 202 becomes zero.

The output of air engine 30 is zero in the above four states except the drive state. Because bicycle 1 has the small running resistance, bicycle 1 frequently has an opportunity of the inertia state during running.

Working of bicycle 1 under the control of controller 101 will be described below. FIG. 6 illustrates a flowchart of a leakage determination made by controller 101.

Initially, controller 101 determines the output command value based on the position of output adjusting slide bar 102, and the output of air engine 30 is adjusted according to the determination of the output command value (Step S1 in FIG. 6).

In Step S2, controller 101 determines whether the output command value is zero. The determination in Step S2 is not limited to the case that the position of output adjusting slide bar 102 corresponds strictly to the output command value of 0, but the determination that the output command value is zero is also made in Step S2 in the case that controller 101 does not operate air engine 30 in a state (for example, less than 3% of rated output) in which the output command value is regarded to be zero. Step S1 is performed again unless the determination is made that the output command value is zero in Step S2.

When the determination is made that the output command value is zero in Step S2, controller 101 starts the leakage determination (Step S3 in FIG. 6). Specifically, while closing on-off valve 5 to form air pipe 8 into a closed space, controller 101 sets regulator 6 such that the output of air motor 3 is zero. Then, controller 101 measures the output of pressure gauge 7 for a given time (for example, 5 seconds). Controller 101 determines the generation of the leakage when the pressure becomes less than a given ratio (for example, 97%) to the pressure at the beginning of the measurement. The leakage determination is easily performed, because the change in pressure increases as the measurement time is lengthened even in the same leakage state. However, the leakage determination is hardly made because a period, in which the output command value is zero, necessary for the leakage determination is also lengthened. Therefore, desirably the measurement time ranges from about 2 seconds to about 15 seconds in consideration of a balance between a frequency of the leakage determination and ease of the determination.

When the pressure is greater than or equal to the ratio (for example, 97%) to the pressure at the beginning of the measurement, controller 101 determines that the leakage is not generated. FIG. 4 illustrates an example of the timing chart in which the leakage determination method is adopted. Because the output command value is zero at times B, D, and G in FIG. 4, determination unit 203 is turned on to start the leakage determination. Because opening and closing instruction unit 204 is in a closed state for a given time (in FIG. 4, Δt), on-off valve 5 is closed. Pressure measuring unit 205 measures the change in pressure for the time, and whether the leakage is generated is determined by magnitude of the change.

Because a given time is required to make the leakage determination, controller 101 checks whether the output command value is zero before the leakage determination is ended (Step S4 in FIG. 6). When the output command value remains at zero, controller 101 continuously determines whether the leakage determination is ended (Step S5 in FIG. 6). When the leakage determination is not ended, the flow returns to Step S4 to check the output command value. When the output command value is not zero in Step S4, controller 101 suspends the leakage determination, the flow returns to Step S1, and the output of air engine 30 is adjusted according to the output command value. For example, when the time Δt1 is longer than Δt in FIG. 4, the time B' or D' on which the leakage determination is ended is shifted later than the time C or E on which the output command value is not zero. In such cases, the leakage determination is suspended. When controller 101 determines that the leakage determination is ended in Step S5, the flow goes to Step S6.

The end of the leakage determination in Step S5 means that controller 101 has determined whether the leakage is generated in air pipe 8 between on-off valve 5 and regulator 6, namely, in on-off valve 5, air pipe 8, regulator 6, and pressure gauge 7.

For mobile objects, such as bicycle 1, which have the small running resistance, the leakage determination is effectively made in the inertia state and the braking state. In riding the bicycle on a flat or the downhill, because a drive force is not required too much except the case of the acceleration, the state in which the output command value becomes zero is frequently generated. The vibration from the road surface acts continuously on a vehicle body, which possibly progresses looseness or a crack of a piping system. Therefore, the leakage determination is made in the inertia state and the braking state, in which it is not necessary to operate the air engine 30, allowing the early detection of the leakage. However, it is not always true that the state in which the output command value is zero is continued for a time enough to make the leakage determination even in vehicles, such as bicycle 1, in which the state is frequently generated. Therefore, the leakage determination is suspended when the output command value becomes not zero, allowing elimination of an influence of the leakage determination on a running property of bicycle 1.

The leakage determination method is not limited to the first exemplary embodiment. For example, while controller 101 sets regulator 6 such that the output of air motor 3 is zero, on-off valve 5 is closed to form the closed space of air pipe 8.

Then, controller 101 measures the output of pressure gauge 7. Controller 101 determines that the leakage is generated, when the pressure becomes less than a given ratio (for example, 97%) to the pressure at the beginning of the measurement, and when the time since the starting of the measurement is less than a given time (for example, 5 seconds). Controller 101 determines that the leakage is not generated, when the pressure becomes less than the ratio (for example, 97%) to the pressure at the beginning of the measurement, and when the time since the starting of the measurement is greater than or equal to the time (for example, 5 seconds).

After the leakage is checked, controller 101 determines whether the leakage is generated in air pipe 8 between on-off valve 5 and regulator 6, namely, in on-off valve 5, air pipe 8, regulator 6, and pressure gauge 7. That is, controller 101 can also determine whether the leakage is generated using the method. FIG. 5 illustrates an example of the timing chart in which the leakage determination method is adopted. Because the output command value becomes zero at the times B, D, and G in FIG. 5, the determination unit 203 is turned on to start the leakage determination. Until pressure measuring unit 205 measures a given change in pressure (in FIG. 5, $\Delta p$) since the leakage determination is started, opening and closing instruction unit 204 becomes the closed state to close on-off valve 5. Whether the leakage is generated is determined by the time necessary to generate the change in pressure. However, for the leakage determination started from the time B, the leakage determination is suspended because the change in pressure is not generated at the time C.

In the above leakage determination methods, desirably the air pipe 8 is formed into the closed space using on-off valve 5, because a flow amount can be reduced during the leakage and the leakage determination time can be shortened. However, in the configuration in which air tank 2 has a small volume (for example, 1 L), the leakage determination can be made with no use of on-off valve 5.

When the pressure is less than a given value (for example, less than 1 atmosphere in terms of a gauge pressure with pressure gauge 7) to the pressure at the beginning of the measurement in the leakage determination, controller 101 may determine that the leakage is not generated without performing the leakage determination, and end the leakage determination. In such cases, the compressed air exists insufficiently in air pipe 8 to hardly make the correct leakage determination. Therefore, the useless leakage determination is eliminated by not making the leakage determination.

When the speed of bicycle 1 is less than a given value (for example, less than 2 km/h with speedmeter 103) in the leakage determination, controller 101 may determine that the leakage is not generated without performing the leakage determination, and end the leakage determination. In such cases, bicycle 1 is not in the running state, and the vibration or a shock is not continuously applied to bicycle 1. Therefore, the repetitive leakage determination is useless while the output of air engine 30 is regarded to be zero. Accordingly, the useless leakage determination is eliminated by not making the leakage determination.

In Step S6, controller 101 determines that the leakage is not generated, on-off valve 5 is opened, the flow returns to Step S1, and the output of air engine 30 is adjusted according to the output command value. When the leakage is generated, the flow goes to Step S7.

In Step S7, controller 101 lights LED 104, which is provided in output adjusting slide bar 102, as a leakage countermeasure to notify the rider of the generation of the leakage.

Then, on-off valve 5 is opened, the flow returns to Step S1, and the output of air engine 30 is adjusted according to the output command value.

As described above, the leakage determination is made every time controller 101 checks that the output command value is zero. Accordingly, when troubles, such as the crack, are generated in air pipe 8 and the like, the symptom of the progression of the compressed gas leakage can instantaneously be found, and the compressed gas leakage can previously be detected. Therefore, reliability of the vehicle can surely be improved.

In the first exemplary embodiment, although two-wheel bicycle 1 is used as an example of the vehicle, the vehicle is not limited thereto. Alternatively, a three-wheel bicycle or a wheel chair may be used as the vehicle.

In the first exemplary embodiment, LED 104 incorporated in output adjusting slide bar 102 is lit as the leakage countermeasure, so that the rider can easily determine whether the leakage is generated. Although LED 104 incorporated in output adjusting slide bar 102 is lit in the first exemplary embodiment, the leakage countermeasure is not limited to the lighting of LED 104. Alternatively, for example, LED 104 provided in another point may be lit, or LED 104 may be blinked instead of the lighting. Alternatively, LED 104 may be turned off in generating the leakage while lit in the normal state. Alternatively, instead of LED 104, the sound or the vibration may notify the rider of the generation of the leakage.

Not only the rider is notified as the leakage countermeasure, but also a dangerousness of the leakage may be avoided such that controller 101 does not open on-off valve 5, but continuously shuts off the supply of the compressed air from the air tank 2 in Step S7.

In the first exemplary embodiment, from the viewpoint of the secure closed state (shutoff state), on-off valve 5 is desirably used as an example of the shutoff valve. Alternatively, using a valve mechanism that can put into a half-open state, supply amount of the compressed air from the air tank 2 may be restricted to reduce the dangerousness caused by the leakage.

Second Exemplary Embodiment

Figure 7:
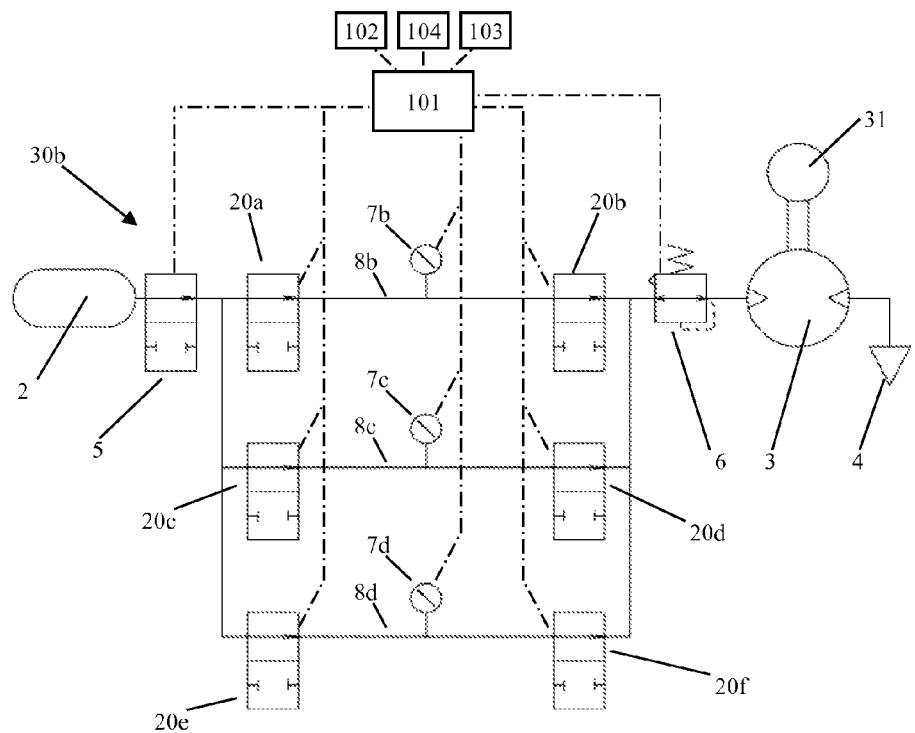
FIG. 7 is a view schematically illustrating an air engine, which includes a plurality of air pipes, according to a second exemplary embodiment of the present invention.
Figure 8:
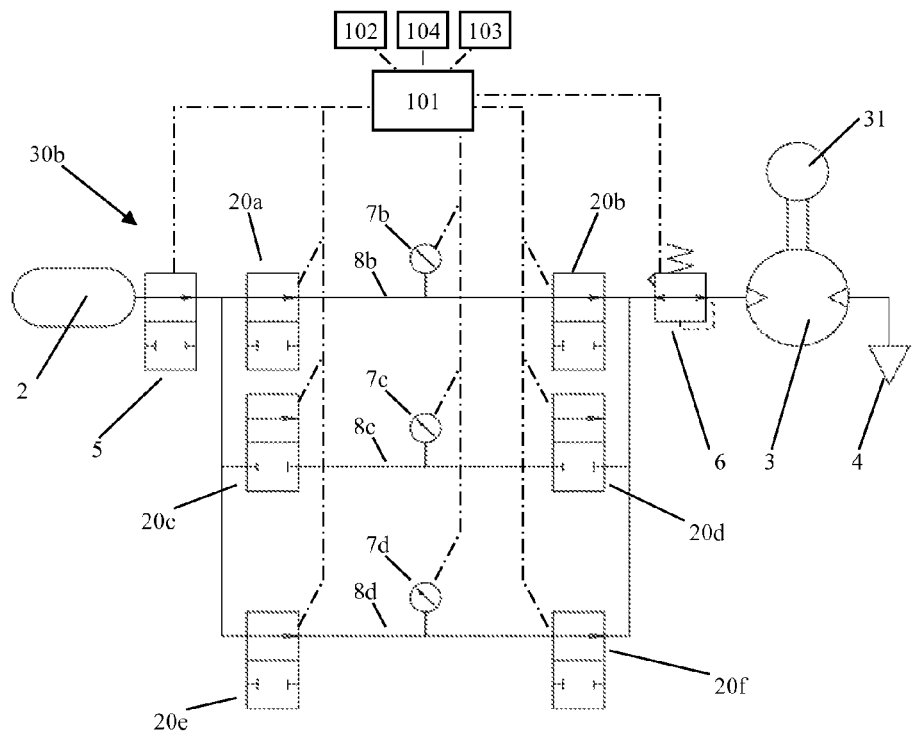
FIG. 8 is a view schematically illustrating the air engine, which selectively connects the plurality of air pipes as an example of a leakage countermeasure, of the second exemplary embodiment of the present invention.

An air engine including plural air pipes is intended for another leakage countermeasure. FIG. 7 schematically illustrates the air engine including the plural air pipes. FIG. 8 schematically illustrates the air engine that is selectively connected to the plural air pipes.

As illustrated in FIG. 7, air pipe 8 may be configured to include air pipes 8b to 8d, and stop the use of the air pipe in which the leakage is generated. In FIG. 7, air engine 30b includes air pipes 8b to 8d in parallel. On-off valves 20a and 20b are provided at both ends of air pipe 8b, on-off valves 20c and 20d are provided at both ends of air pipe 8c, and on-off valves 20e and 20f are provided at both ends of air pipe 8d. In order to measure the pressure, pressure gauge 7b is provided in air pipe 8b, pressure gauge 7c is provided in air pipe 8c, and pressure gauge 7d is provided in air pipe 8d. On-off valves 20a to 20f and pressure gauges 7b to 7d are connected to controller 101, and controller 101 makes a pressure determination of air pipes 8b to 8d in a parallel or independent manner.

With this configuration, when only the on-off valves at both the ends of the air pipe in which the leakage is generated are shut off in Step S7 in FIG. 6, air engine 30b is continuously operated while the dangerousness of the leakage is prevented. For example, in the case that controller 101 determines that the leakage is generated in air pipe 8c from the state in FIG. 7, as illustrated in FIG. 8, controller 101 shuts off on-off valves 20c and 20d to prevent the leakage from air pipe 8c, and the compressed air is continuously supplied to air motor 3 using air pipes 8b and 8d. Therefore, air engine 30b can continuously be operated until the leakages are generated in all air pipes 8b to 8d or until the leakage is generated in on-off valve 5 or regulator 6. Although only the air pipe in which the leakage is generated is shut off in the second exemplary embodiment, the present invention is not limited to the second exemplary embodiment.

For example, only air pipe 8b is used in the initial state, and controller 101 determines that leakage is generated in air pipe 8b. In such cases, on-off valves 20a and 20b are closed such that air pipe 8b is not used. On-off valves 20c and 20d are opened to use air pipe 8c instead, and the air pipe used may be switched every time the leakage is generated in the air pipe. At this point, the on-off valve is not provided in each air pipe, but the air pipe used may be switched by at least one selector valve.

In the first exemplary embodiment, desirably the output command value is zero during the braking, and the leakage determination is easily made. However, the present invention is not limited to the first exemplary embodiment. Alternatively, the output command value may become negative in order to regenerate the energy during the braking. In this case, the leakage determination started from the time G is suspended at the time H in FIGS. 4 and 5.

In the first and second exemplary embodiments, desirably air tank 2 is filled with the compressed air from the viewpoint of a price, safety, and atmospheric release. However, the present invention is not limited to the first and second exemplary embodiments. Alternatively, inert gases, such as nitrogen, may be used instead of the compressed air.

In the first and second exemplary embodiments, regulator 6 is used as an example of the control valve, and desirably the output of air motor 3 is easily adjusted by the simple configuration. However, the present invention is not limited to the first and second exemplary embodiments. Alternatively, any control valve may be used as long as the output of the gas machinery to be operated is adjustable.

In the first and second exemplary embodiments, the vehicle and the control device are integrally provided. Alternatively, the control device may solely make the leakage determination of the present invention.

In the first and second exemplary embodiments, the configuration of the control device is described by the speed measuring unit, the instruction unit, the adjuster, the determination unit, the opening and closing instruction unit, and the pressure measuring unit. However, the above components are not always necessary for the leakage determination of the present invention. The determination of the leakage can be made when the control device includes at least the pressure measuring unit and the determination unit. The determination of the leakage can be made by a combination of the pressure measuring unit and determination unit and another component as needed basis.

The present invention can be implemented as not only the control device including the characteristic processing unit but also the leakage determination method in which the characteristic processing unit included in the control device is used as a step. Additionally, the present invention can be implemented as a computer program that causes a computer to perform the characteristic step included in the leakage determination method. Needless to say, the computer program can be distributed through computer-readable recording mediums, such as a CD-ROM (Compact Disc-Read Only Memory), and communication networks, such as the Internet.

In the following, other alternatives of the embodiment of the present inventions are explained.

First alternative is a vehicle that runs with an air engine including a gas machinery, wherein the air engine includes:

a gas container in which a compressed gas is accumulated;

the gas machinery that is driven by the compressed gas supplied from the gas container;

a control valve that controls an output of the gas machinery;

a piping unit that connects the gas container and the control valve; and a pressure gauge that detects a pressure of the compressed gas at the piping unit, the vehicle includes:

a manipulation instruction unit that outputs a command value corresponding to a target output of the gas machinery; and a control device that operates the control valve based on the command value from the manipulation instruction unit, and controls the output of the gas machinery such that the target output is obtained, the control device includes:

a pressure measuring unit that measures the pressure of the compressed gas at the piping unit based on an output of the pressure gauge; and a determination unit that determines a leakage state of the compressed gas based on a change in pressure, which is measured by the pressure measuring unit every time the target output of the gas machinery becomes substantial zero, the control device measures a time until a change in pressure measured by the pressure measuring unit reaches a given amount based on a time point at which the target output of the gas machinery becomes substantial zero, the control device determines that the compressed gas leaks when the measured time is less than a given time, and the control device suspends the determination of the leakage state when the target output of the gas machinery changes from substantial zero before the change in pressure, which is measured by the pressure measuring unit reaches the given amount.

Second alternative is a vehicle of the first alternative, wherein the target output of the gas machinery becomes substantial zero during braking in the vehicle.

Third alternative is a vehicle of the first alternative, wherein the vehicle is a bicycle.

Fourth alternative is a vehicle of the first alternative, wherein the control device suspends the determination of the leakage state when the pressure measured by the pressure measuring unit is less than or equal to a given amount at the time point at which the target output of the gas machinery becomes substantial zero.

Fifth alternative is a vehicle of the first alternative further comprising a speed measuring unit that measures a speed of the vehicle, wherein the control device determines the leakage state only when the measured speed of the vehicle is greater than or equal to a given amount.

Sixth alternative is a vehicle of the first alternative further comprising a leakage-state indicator indicating that the control device determines that the compressed gas leaks.

Seventh alternative is a vehicle of the first alternative further comprising a shutoff valve between the gas container and the piping unit, wherein the control device operates the shutoff valve to shut off a flow of the compressed gas from the gas container while determining the leakage state.

Eighth alternative is a vehicle of the first alternative, wherein the control device operates the shutoff valve to shut off the flow of the compressed gas from the gas container irrespective of the target output of the gas machinery when determining that the compressed gas leaks.

Ninth alternative is a vehicle of the first alternative, wherein the plurality of piping units are connected in parallel, the control device can selectively shut off each piping unit, and the control device individually shuts off the piping unit, in which the leakage is generated, based on a leakage determination result of the compressed gas.

Tenth alternative is a control device that is used in an air engine including a gas machinery, the control device comprising:

an adjuster that controls an output of the gas machinery such that a target output is obtained by a compressed gas;

a pressure measuring unit that measures the pressure of the compressed gas at the piping unit of the air engine; and a determination unit that determines a leakage state of the compressed gas based on a change in pressure, which is measured by the pressure measuring unit every time the target output of the gas machinery becomes substantial zero, wherein the control device measures a time until a change in pressure measured by the pressure measuring unit reaches a given amount based on a time point at which the target output of the gas machinery becomes substantial zero, the control device determines that the compressed gas leaks when the measured time is less than a given time, and the control device suspends the determination of the leakage state when the target output of the gas machinery changes from substantial zero before the change in pressure, which is measured by the pressure measuring unit reaches the amount.

Eleventh alternative is a control device of the tenth alternative, wherein the air engine includes:

a gas container in which a compressed gas is accumulated;

the gas machinery that is driven by the compressed gas supplied from the gas container;

a control valve that controls an output of the gas machinery;

a piping unit that connects the gas container and the control valve; and a pressure gauge that detects a pressure of the compressed gas at the piping unit;

wherein the adjuster operates the control valve to control the output of the gas machinery such that a target output is obtained; and a pressure measuring unit measures the pressure of the compressed gas at the piping unit based on an output of the pressure gauge.

Twelfth alternative is an air engine including a gas machinery, the air engine comprising:

a gas container in which a compressed gas is accumulated;

a gas machinery that is driven by the compressed gas supplied from the gas container;

a control valve that controls an output of the gas machinery;

a piping unit that connects the gas container and the control valve;

a pressure gauge that detects a pressure of the compressed gas at the piping unit; and a control device that controls the output of the gas machinery such that a target output is obtained, wherein the control device includes:

an adjuster that operates the control valve to control the output of the gas machinery such that the target output is obtained;

a pressure measuring unit that measures the pressure of the compressed gas at the piping unit based on an output of the pressure gauge; and a determination unit that determines a leakage state of the compressed gas based on a change in pressure, which is measured by the pressure measuring unit every time the target output of the gas machinery becomes substantial zero, the control device measures a time until a change in pressure measured by the pressure measuring unit reaches a given amount based on a time point at which the target output of the gas machinery becomes substantial zero, the control device determines that the compressed gas leaks when the measured time is less than a given time, and the control device suspends the determination of the leakage state when the target output of the gas machinery changes from substantial zero before the change in pressure, which is measured by the pressure measuring unit reaches the given amount.

INDUSTRIAL APPLICABILITY

In accordance with the present invention, in the power unit operated by the compressed gas and the vehicle in which the power unit is used, the reliability of the power unit and the vehicle can usefully be improved by securely detecting the gas leakage. Moreover, in addition to driving the vehicle, the present invention is useful for a portable power unit for a system, such as tools, operated by the compressed gas.

REFERENCE MARKS IN THE DRAWINGS 1 bicycle
2 air tank
3 air motor
4 opening port to atmosphere
5 on-off valve
6 regulator
7, 7b, 7c, 7d pressure gauge
8, 8b, 8c, 8d air pipe
20a, 20b, 20c, 20d, 20e, 20f on-off valve
30, 30b air engine 31, 32 sprocket
33 drive chain
34 rear wheel
35 handlebar
36 front wheel
37 front fork
101 controller
102 output adjusting slide bar
103 speedmeter
104 LED
105 magnet
200 speed measuring unit
201 instruction unit
202 adjuster
203 determination unit
204 opening and closing instruction unit
205 pressure measuring unit

The invention claimed is:

1. A bicycle comprising an air engine, wherein the air engine includes:
   a gas container in which a compressed gas is accumulated;
   gas machinery that is driven by the compressed gas supplied from the gas container;
   a control valve that controls an output of the gas machinery;
   a piping unit that connects the gas container and the control valve;
   a shutoff valve between the gas container and the piping unit; and
   a pressure gauge that detects a pressure of the compressed gas at the piping unit, the bicycle further comprising:
   a manipulation instruction unit that outputs a command value corresponding to a target output of the gas machinery; and
   a control device that operates the control valve based on the command value from the manipulation instruction unit, and controls the output of the gas machinery such that the target output is obtained,
   wherein the control device includes:
   a pressure measuring unit that measures the pressure of the compressed gas at the piping unit based on an output of the pressure gauge; and
   a determination unit that determines a leakage state of the compressed gas based on a change in pressure, which is measured by the pressure measuring unit every time the target output of the gas machinery becomes substantially zero,
   wherein the control device compares the pressure, which is measured by the pressure measuring unit at the time the target output of the gas machinery becomes substantially zero, to a pressure that is measured by the pressure measuring unit after a given time elapses, the control device determines that the compressed gas leaks when a pressure difference is greater than a given amount, and the control device suspends the determination of the leakage state when the target output of the gas machinery changes from substantially zero within the given time,
   wherein the bicycle has a plurality of states including a drive state in which the bicycle accelerates or runs at a constant speed, a braking state in which a braking force of a brake is provided to the bicycle, and an inertia state in which a speed of the bicycle is not zero,
   wherein the control device operates the shutoff valve to shut off a flow of the compressed gas from the gas container to the piping unit in the inertia state,
   wherein the control device operates the shutoff valve to permit the flow of the compressed gas from the gas container to the piping unit in the drive state and the braking state,
   wherein the inertia state is a state immediately after a first state and immediately before a second state,
   wherein the first state and the second state occur in a plurality of combinations, and one combination of the plurality of combinations of the first state and the second state is that the first state is the drive state and the second state is the braking state, and
   wherein the determination unit begins determination of the leakage state in the inertia state.

2. The bicycle according to claim 1, wherein the target output of the gas machinery becomes substantially zero during the braking state of the bicycle.

3. The bicycle according to claim 1, wherein the control device suspends the determination of the leakage state when the pressure measured by the pressure measuring unit is less than or equal to a given amount at the time point at which the target output of the gas machinery becomes substantially zero.

4. The bicycle according to claim 1, wherein the control device includes a leakage-state indicator indicating that the control device determines that the compressed gas leaks.

5. The bicycle according to claim 1,
   wherein the control device operates the shutoff valve to shut off the flow of the compressed gas from the gas container while determining the leakage state.

6. The bicycle according to claim 5, wherein the control device operates the shutoff valve to shut off the flow of the compressed gas from the gas container when determining that the compressed gas leaks.

7. The bicycle according to claim 1, wherein the piping unit is a plurality of piping units, the plurality of piping units are connected in parallel, the control device can selectively shut off each piping unit from among the plurality of piping units, and the control device individually shuts off a piping unit from among the plurality of piping units, in which the leakage is generated, based on a leakage determination result of the compressed gas.

8. A control device that is used in an air engine of a bicycle, the air engine including a gas machinery, the control device comprising:
   an adjuster that controls an output of the gas machinery such that a target output is obtained by a compressed gas;
   a pressure measuring unit that measures a pressure of the compressed gas at a piping unit of the air engine; and
   a determination unit that determines a leakage state of the compressed gas based on a change in pressure, which is measured by the pressure measuring unit every time the target output of the gas machinery becomes substantially zero,
   wherein the control device compares the pressure, which is measured by the pressure measuring unit at the time the target output of the gas machinery becomes substantially zero, to a pressure that is measured by the pressure measuring unit after a given time elapses, the control device determines that the compressed gas leaks when a pressure difference is greater than a given amount, and the control device suspends the determination of the leakage state when the target output of the gas machinery changes from substantially zero within the given time,
   wherein the bicycle has a plurality of states including a drive state in which the bicycle accelerates or runs at a constant speed, a braking state in which a braking force of a brake is provided to the bicycle, and an inertia state in which a speed of the bicycle is not zero, wherein the control device operates a shutoff valve to shut off a flow of the compressed gas from a gas container in which the compressed gas is accumulated to the piping unit in the inertia state, wherein the control device operates the shutoff valve to permit the flow of the compressed gas from the gas container to the piping unit in the drive state and the braking state, wherein the inertia state is a state immediately after a first state and immediately before a second state, wherein the first state and the second state occur in a plurality of combinations, and one combination of the plurality of combinations of the first state and the second state is that the first state is the drive state and the second state is the braking state, and wherein the determination unit begins determination of the leakage state in the inertia state.

9. A control device according to claim 8, wherein the air engine includes:

the gas machinery that is driven by the compressed gas supplied from the gas container;

a control valve that controls an output of the gas machinery; and a pressure gauge that detects a pressure of the compressed gas at the piping unit, wherein the piping unit connects the gas container and the control valve, wherein the adjuster operates the control valve to control the output of the gas machinery such that a target output is obtained, and wherein a pressure measuring unit measures the pressure of the compressed gas at the piping unit based on an output of the pressure gauge.

* * * * *